(12) United States Patent
Walker et al.

(10) Patent No.: US 6,847,965 B2
(45) Date of Patent: Jan. 25, 2005

(54) METHOD AND APPARATUS FOR MAINTAINING A CUSTOMER DATABASE USING LICENSE PLATE SCANNING

(75) Inventors: Jay S. Walker, Ridgefield, CT (US); Andrew S. Van Luchene, Norwalk, CT (US); Joshua D. Rogers, New York, NY (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 10/124,697

(22) Filed: Apr. 10, 2002

(65) Prior Publication Data

US 2002/0111881 A1 Aug. 15, 2002

Related U.S. Application Data

(63) Continuation of application No. 09/166,339, filed on Oct. 5, 1998, now Pat. No. 6,374,240.

(51) Int. Cl.[7] ............................................. G06F 17/30
(52) U.S. Cl. ..................... 707/5; 707/104.1; 701/717
(58) Field of Search ..................... 707/1–5, 6, 104.1, 707/100, 101; 705/7, 15, 16, 37, 26, 36; 701/117

(56) References Cited

U.S. PATENT DOCUMENTS

| | | | |
|---|---|---|---|
| 4,567,609 A | 1/1986 | Metcalf | 382/9 |
| 4,603,390 A | 7/1986 | Mehdipour et al. | 364/467 |
| 4,743,022 A | 5/1988 | Wood | 273/85 CP |
| 4,817,166 A | 3/1989 | Gonzalez et al. | 382/1 |
| 4,878,248 A | 10/1989 | Shyu et al. | 382/9 |
| 4,922,435 A | 5/1990 | Cahlander et al. | 364/513 |
| 4,963,723 A | 10/1990 | Masada | 235/384 |
| 5,034,739 A | 7/1991 | Gruhl | 340/932.2 |
| 5,058,044 A | 10/1991 | Stewart et al. | 364/551.01 |
| 5,081,685 A | 1/1992 | Jones, III et al. | 382/1 |
| 5,136,658 A | 8/1992 | Mori | 382/1 |
| 5,193,648 A | 3/1993 | Yuter | 186/38 |
| 5,204,675 A | 4/1993 | Sekine | 340/933 |
| 5,256,863 A | 10/1993 | Ferguson et al. | 235/383 |
| 5,315,664 A | 5/1994 | Kumagai | 382/1 |
| 5,325,291 A | 6/1994 | Garrett et al. | 364/401 |
| 5,353,219 A | 10/1994 | Mueller et al. | 364/405 |
| 5,381,155 A | 1/1995 | Gerber | 342/104 |
| 5,422,473 A | 6/1995 | Kamata | 235/384 |
| 5,425,108 A | 6/1995 | Hwang et al. | 382/105 |
| 5,482,139 A | 1/1996 | Rivalto | 186/36 |

(List continued on next page.)

OTHER PUBLICATIONS

Ramirez, Anthony, "The Pizza Version of Dialing '911'", The New York Times, Sep. 9, 1991, Section D, p. 1, Column 3, Financial Desk.

O'Kane, Gerry, "Parking your car by computer", South China Morning Post, Mar. 23, 1993, Section: Supplement, p. 3.

Rubel, Chad, "Young firm armed with technology fights an old giant; ETM to Ticketmaster: Let's rock", Marketing News TM, Jun. 19, 1995, p. 2.

"Click this box for extra pepperoni; CyberSlice routes online orders", The Dallas Morning News, Dec. 2, 1996, Section: Business, p. 6D.

Popyk, Bob, "Turn customers into torchbearers", Boating Industry, Sep. 1997, Section: No. 9, vol. 60, p. 33, ISSN: 0006–5404.

(List continued on next page.)

*Primary Examiner*—Shahid Alam
(74) *Attorney, Agent, or Firm*—Dean P. Alderucci

(57) ABSTRACT

An apparatus is provided for generating an image of a license plate and determining license plate characters from the image. Then, a database is searched to determine if there is a customer record that corresponds to the license plate characters. If so, the customer record is retrieved and information about the customer is available. Otherwise, a customer record is created. The created customer record corresponds to the license plate characters and stores transaction data that represents a transaction.

3 Claims, 23 Drawing Sheets

U.S. PATENT DOCUMENTS

| | | | |
|---|---|---|---|
| 5,568,406 A | 10/1996 | Gerber | 364/562 |
| 5,591,972 A | 1/1997 | Noble et al. | 250/330 |
| 5,604,901 A | 2/1997 | Kelley et al. | 395/603 |
| 5,638,302 A | 6/1997 | Gerber | 364/556 |
| 5,651,075 A | 7/1997 | Frazier et al. | 382/105 |
| 5,666,493 A | 9/1997 | Wojcik et al. | 705/26 |
| 5,687,322 A | 11/1997 | Deaton et al. | 395/214 |
| 5,710,557 A | 1/1998 | Schuette | 340/932.2 |
| 5,719,396 A | 2/1998 | Jack et al. | 250/338.5 |
| 5,726,450 A | 3/1998 | Peterson et al. | 250/338.5 |
| 5,737,710 A | 4/1998 | Anthonyson | 701/1 |
| 5,832,457 A | 11/1998 | O'Brien et al. | 705/14 |
| 5,842,178 A | 11/1998 | Giovannoli | 705/26 |
| 5,842,212 A | 11/1998 | Ballurio et al. | 707/100 |
| 5,938,717 A | 8/1999 | Dunne et al. | 701/117 |
| 5,948,038 A | 9/1999 | Daly et al. | 701/117 |
| 6,026,375 A | 2/2000 | Hall et al. | 705/26 |
| 6,374,240 B1 * | 4/2002 | Walker et al. | 705/15 |

OTHER PUBLICATIONS

"Grocery shopping goes on line in many markets. Technology spurs remote ordering concept", The Dallas Morning News, May 12, 1997, Section: Business, p. 2D.

Heller, Al, "Chain Pharmacy: Forecast '98: New Technology Advances Pharmacy Productivity", Drug Store News, Jan. 12, 1998, Section: p. CP29.

Rubinstein, Ed, "Internet Continues to Fortify Takeout Sector For Operations", Nation's Restaurant News, Mar. 23, 1998, Section: p. 55.

"Catching Red Light Runners", Advanced Transportation Technology News, Jun. 1998, Section: vol. 5, No. 2.

Website: "Route Sales Automation", (http //www dacobusy com/), download date: Mar. 16, 1999.

Website: "Unit Tracking with the General Manager", Garage management needs., (http //www dacobusy com/garage/idxgarg htm), download date: Mar. 16, 1999.

Website: "Alphatech, Inc. Looking to the Futue", (http // www alphatech com/), download date: Mar. 25, 1999.

Website "Alphatech: Technologies and Projects", (http // www alphatech com/secondary/techpro/compvis html), download date: Mar. 25, 1999.

Website: "IMPS Vehicle License Plate Recognition System", (http //www Singapore com/optasia/imps), download date: Mar. 25, 1999.

Website: Moving and Stationary Target Acquisition and Recognition (MSTAR), MSTAR main, (http www alphatech com/secondary/techpro/projects/mstar/MSTAR_TopLevel html), download date: Mar. 25, 1999.

* cited by examiner

| | MERCHANT IDENTIFIER 620 | NAME 622 | ADDRESS 624 | SIC CODE 626 |
|---|---|---|---|---|
| 602 → 604 → | M0001 | CORP. X | 123 MAIN ST. CITY, USA | 1111 |
| 606 → | M0002 | STORE Y | 8910 RIVER PL. SUBURB, USA | 2222 |
| → | M0003 | OUTLET Z | 248 STATE HWY. TOWN, USA | 3333 |

| | | | |
|---|---|---|---|
| LICENSE PLATE   ABCDEF/CT | | | 702 |
| DEAN GREEN | | | 704 |
| ADDRESS   5500 MAIN ST   CITY, USA | | | 706 |
| CREDIT CARD NUMBER   1111-2222-3333-4444 | | | 708 |
| DEFAULT ORDER:   1 HAMBURGER, 1 SMALL COLA | | | 710 |
| TRANSACTION IDENTIFIER 720 | MERCHANT IDENTIFIER 722 | DATE AND TIME 724 | PURCHASE PRICE 726 |
| 12345678901 | M0001 | 3/7/99 10:06 AM | $12.83 |
| 12345678909 | M0002 | 3/12/99 1:14 PM | $8.49 |

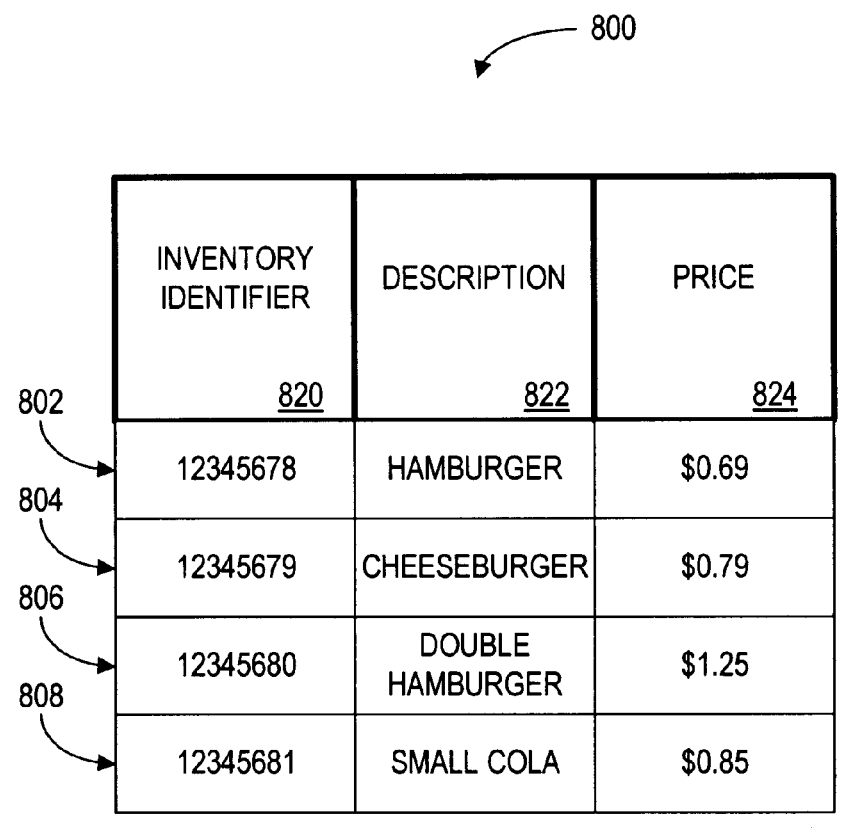

| INVENTORY IDENTIFIER 820 | DESCRIPTION 822 | PRICE 824 |
|---|---|---|
| 12345678 | HAMBURGER | $0.69 |
| 12345679 | CHEESEBURGER | $0.79 |
| 12345680 | DOUBLE HAMBURGER | $1.25 |
| 12345681 | SMALL COLA | $0.85 |

FIG. 8

| REMOTE ORDER IDENTIFIER 920 | DATE AND TIME ORDERED 922 | LICENSE PLATE CHARACTERS 924 | ITEMS ORDERED 926 | MERCHANT IDENTIFIER 928 |
|---|---|---|---|---|
| 123456 | 1/3/99 11:00 AM | ABCDEF/CT | 1 HAMBURGER | M0001 |
| 123457 | 1/3/99 12:03 PM | 123ABC/NY | 1 SMALL COLA, 1 HAMBURGER | M0002 |
| 123458 | 1/4/99 7:11 PM | 123987/NM | 1 HAMBURGER, 1 CHEESEBURGER | M0003 |

| CUSTOMER IDENTIFIER 99123 | | | 1102 |
|---|---|---|---|
| COMPLIMENTARY ITEM 1120 | NUMBER REMAINING 1122 | DATE LAST RECEIVED 1124 | TIME PERIOD 1126 |
| 12345679 | 17 | 1/3/99 | 2 WEEKS |

| CUSTOMER IDENTIFIER   99123 | | | |
|---|---|---|---|
| | | | 1202 |
| INVENTORY IDENTIFIER  1220 | DESCRIPTION  1222 | CUSTOM PRICE  1224 | RESTRICTIONS  1226 |
| 12345678 | HAMBURGER | $0.60 | NONE |
| 12345679 | CHEESEBURGER | $0.65 | PURCHASE PRICE > $5.00 |

1204 → (row 12345678)
1206 → (row 12345679)

FIG. 12

| CUSTOMER IDENTIFIER 99123 1302 ||
|---|---|
| DEFAULT ORDER ITEMS 1320 | WHEN ACTIVE 1322 |
| 2 HAMBURGERS, 2 SMALL COLAS | WEEKDAYS BETWEEN 12:00 PM AND 4:30 PM |
| 1 HAMBURGER, 1 SMALL COLA | WEEKDAYS AFTER 4:30 PM |
| 2 CHEESEBURGERS, 1 SMALL COLA | WEEKENDS |

METHOD AND APPARATUS FOR MAINTAINING A CUSTOMER DATABASE USING LICENSE PLATE SCANNING

The present Application is a Continuation Application of U.S. patent application Ser. No. 09/166,339 entitled "METHOD AND APPARATUS FOR MAINTAINING A CUSTOMER DATABASE USING LICENSE PLATE SCANNING", filed Oct. 5, 1998 U.S. Pat No. 6,374,240 in the name of Jay S. Walker, Andrew S. Van Luchene and Joshua D. Rogers. The entirety of the above-referenced Application is incorporated by reference herein for all purposes.

CROSS REFERENCE TO RELATED APPLICATIONS

This application is related to co-pending U.S. patent application Ser. No. 09/166,367 entitled "METHOD AND APPARATUS FOR PROVIDING A DISCOUNT TO A CUSTOMER THAT PARTICIPATES IN TRANSACTIONS AT A PLURALITY OF MERCHANTS" filed on Oct. 5, 1998 in the name of Jay S. Walker, Andrew S. Van Luchene, Magdalena Mik and Daniel E. Tedesco; and is further related to co-pending U.S. patent application Ser. No. 09/166,405 entitled "METHOD AND APPARATUS FOR DEFINING ROUTING OF CUSTOMERS BETWEEN MERCHANTS" filed on Oct. 5, 1998 in the name of Jay S. Walker, Andrew Van Luchene, Daniel E. Tedesco, Magdalena Mik and James A. Jorasch, each of which is assigned to the assignee of the present application and each of which is incorporated by reference herein as part of the present disclosure.

FIELD OF THE INVENTION

The present invention relates to methods and apparatus for creating and maintaining customer information.

BACKGROUND OF THE INVENTION

Many quick-service restaurants and other businesses have a "drive-through" which allows customers to place an order and also receive the ordered items without exiting their vehicle. A typical drive-through is a roadway equipped with a speaker and microphone to allow a customer in a vehicle to interact with a cashier operating a remote point-of-sale (POS) terminal. A drive-through allows customers to make purchases more conveniently, and consequently businesses with drive-throughs tend to promote customer satisfaction and customer loyalty.

However, applicants have recognized that drive-through customers may be provided with additional benefits. In particular, drive-through customers may be provided with customized benefits in a manner not addressed by the prior art.

SUMMARY OF THE INVENTION

It is an object of the present invention to provide drive-through customers with customized benefits.

In accordance with the present invention, an apparatus is provided for generating an image of a license plate and determining license plate characters from the image. Then, a database is searched to determine if there is a customer record that corresponds to the license plate characters. If so, the customer record is retrieved and information about the customer is available. Otherwise, a customer record is created. The created customer record corresponds to the license plate characters and stores transaction data that represents a transaction.

BRIEF DESCRIPTION OF THE DRAWINGS

FIG. 6 is a schematic illustration of an embodiment of a merchant database of the apparatus of FIG. 1.

FIG. 7 is a schematic illustration of a record of an embodiment of a customer database of the apparatus of FIG. 1.

FIG. 8 is a schematic illustration of an embodiment of an inventory database of the apparatus of FIG. 1.

FIG. 9 is a schematic illustration of an embodiment of a remote order database of the apparatus of FIG. 1.

FIG. 11 is a schematic illustration of a record of an embodiment of a complimentary item database of the apparatus of FIG. 1.

FIG. 12 is a schematic illustration of a record of an embodiment of a custom price database of the apparatus of FIG. 1.

FIG. 13 is a schematic illustration of a record of an embodiment of a default order database of the apparatus of FIG. 1.

DETAILED DESCRIPTION OF THE PREFERRED EMBODIMENTS

Heretofore, restaurants and other businesses have not been able to differentiate between drive-through customers, much less customize orders (sets of items to be purchased) for drive-through customers or otherwise benefit from the ability to identify drive-through customers. In particular, in accordance with the present invention a database of customer information may be created in a passive, unobtrusive manner without forcing customers or merchants to depart from their existing practices. Applicants are unaware of any such prior art systems for providing additional benefits to drive-through customers. Since customers may be identified by their license plates, the customers can be provided with customized service in a manner not recognized or described by the prior art. For example, customers at a drive-though may be provided with customized services such as (i) custom item prices, (ii) custom menu arrangements, (iii) the ability to collect remotely-ordered items, (iv) the ability to have default orders processed, (v) customized suggestive sale offers, (vi) benefits for participating in many transactions, (vii) benefits for participating in transactions with great frequency, and (viii) the ability to periodically collect items that are complimentary or prepaid.

Figure 1:
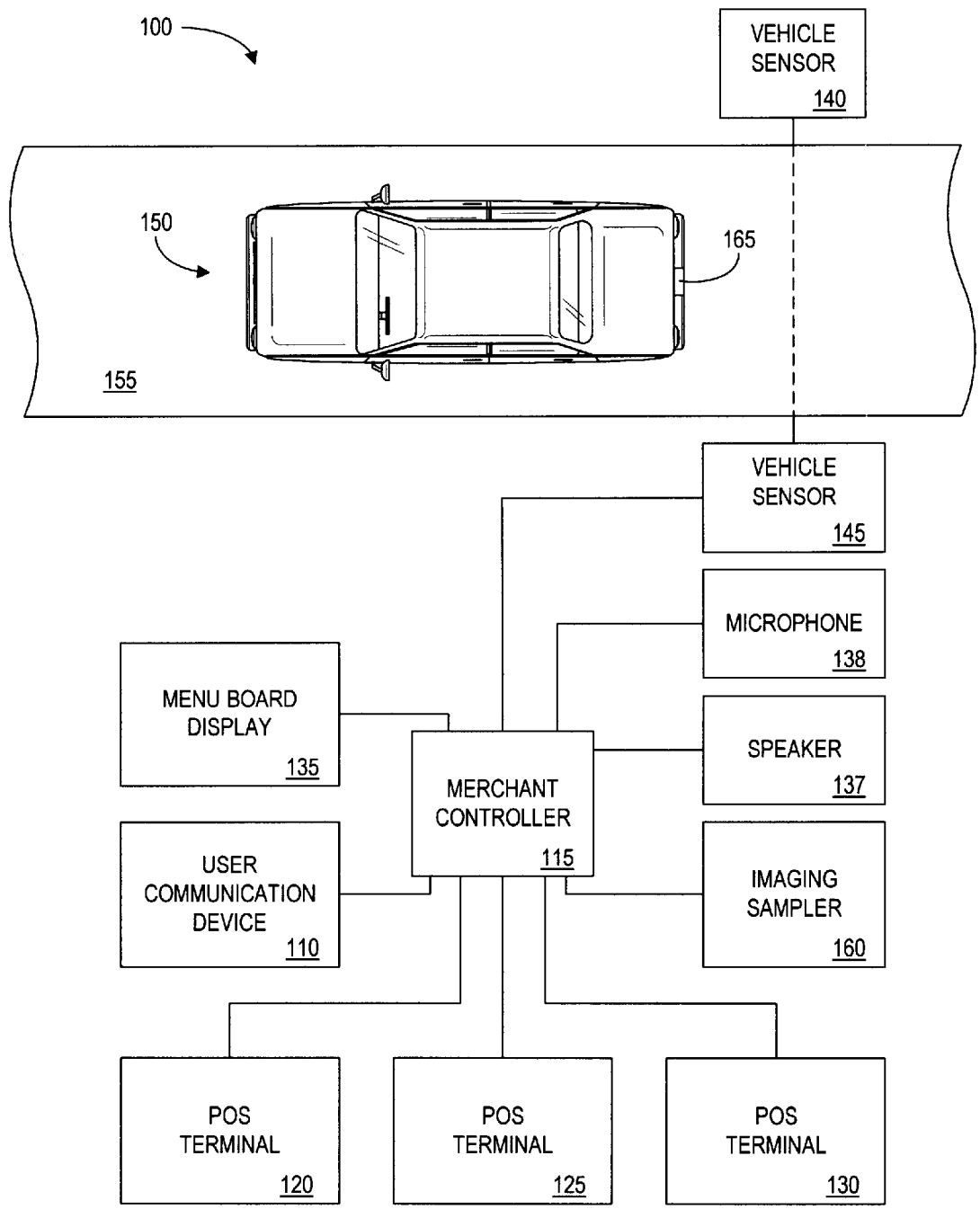
FIG. 1 is a schematic illustration of an apparatus provided in accordance with the present invention.

Referring to FIG. 1, an apparatus 100 comprises a user communication device 110 in communication with a merchant controller 115. The user communication device 110 may be, for example, a computer or a telephone operated by a customer that places a remote order. Accordingly, the user communication device 110 is typically located remotely from the merchant controller 115, and may be located in the customer's home. The merchant controller 115 is a computer or similar control device that directs the operation of various devices of a restaurant or other business, as described in further detail below. The merchant controller 115 is typically but not necessarily located in a store building of the business.

Figure 3:
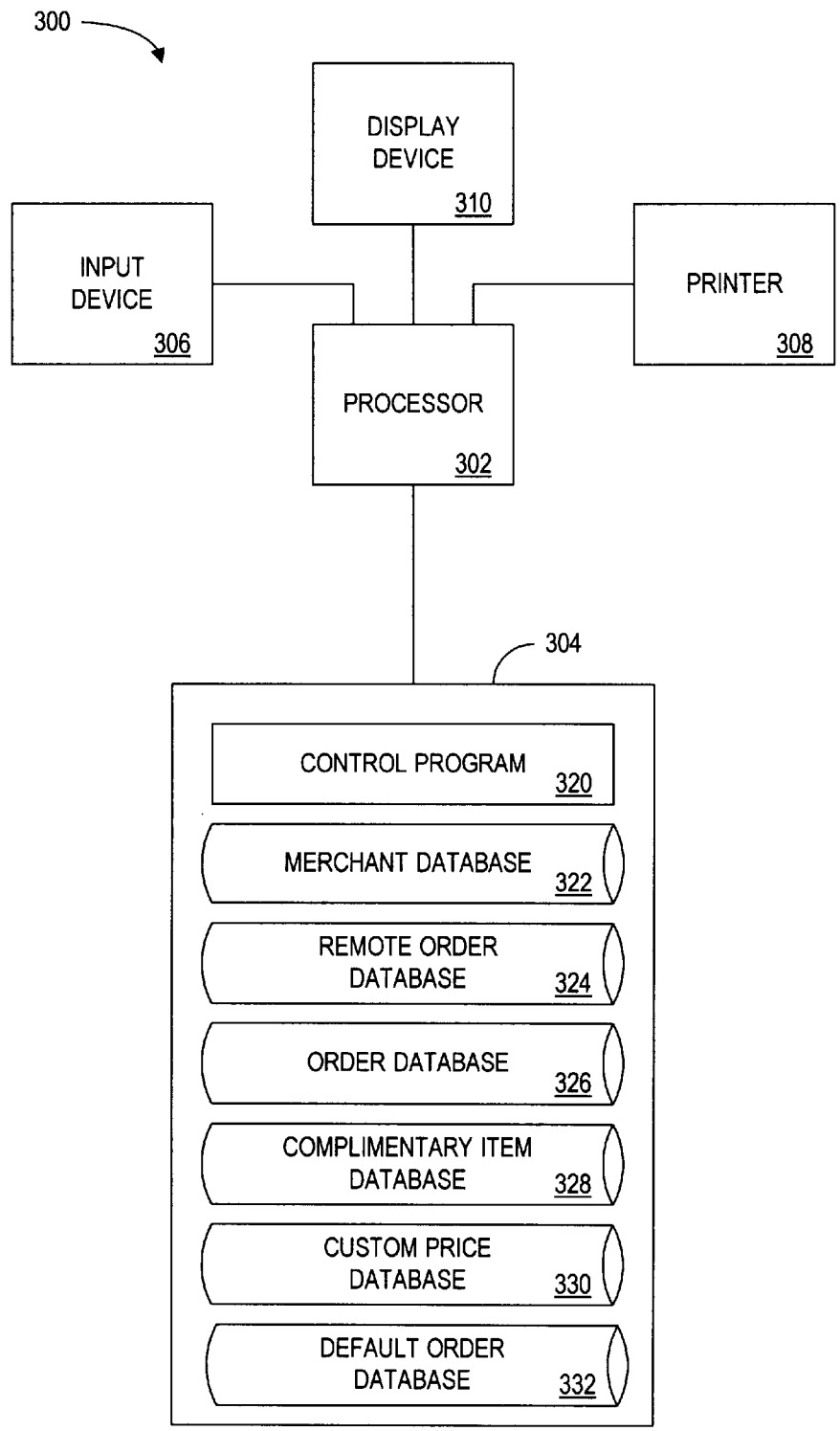
FIG. 3 is a schematic illustration of a merchant controller of the apparatus of FIG. 1.

The merchant controller 115 is also in communication with POS terminals 120, 125 and 130. The POS terminals may be, for example, cash registers located in the store building of the business. Although three POS terminals are shown in FIG. 3, any number of POS terminals may be in communication with the merchant controller 115.

A menu board display 135, such as the Digital Menu-Board™ by Siren Technologies of Chicago, Ill., is in communication with the merchant controller 115 and is operable to display items which may be ordered and corresponding prices for the displayed items, as commanded by the merchant controller 115. The menu board display 135 may be positioned to allow drive-through customers to view the menu board display 135 before (or while) ordering in the drive-through. A speaker 137 and a microphone 138 in communication with the merchant controller 115 allow drive-through customers to communicate with store personnel, such as cashiers operating POS terminals, that operate respective speakers and microphones (not shown) for talking to and listening to the drive-through customers in a manner known in the art. The speaker 137 and the microphone 138 need not be in communication with the merchant controller 115, but may instead be solely in communication with the corresponding speaker and microphone of store personnel.

Vehicle sensors 140 and 145 are positioned on opposite sides of a roadway 155 such as a drive-through alley in a fast food restaurant. The vehicle sensors 140 and 145 are adapted to detect the presence and/or the absence of a vehicle 150 located on the roadway 155. The vehicle sensors 140 and 145 may comprise, for example, pressure sensors located beneath the roadway 155 that detect the weight of the vehicle 150. Alternately, vehicle sensors 140 and 145 may comprise, respectively, a light transmitter and a receiving photo sensor (an optical detector) that cooperate to detect the presence of the vehicle 150 when the transmitted light is blocked by the vehicle 150 and thus is not received by the receiving photo sensor. Other means for detecting the presence and the absence of a vehicle will be understood by those skilled in the art.

The merchant controller 115 is also in communication with an imaging sampler 160, which may comprise a video camera that reads ("samples") an image of a license plate 165 attached to the vehicle 150 and generates a corresponding image signal. The image signal may be a digital image. The image sampler 160 may further be operable to focus on the license plate 165 of the vehicle 150. In alternate embodiments, the merchant controller 115 may direct the focusing on the license plate 165. Generated image signals are transmitted to the merchant controller 115, which is operable to store and recognize the characters on the license plate 165, as described below. For a description of prior art systems for generating images of license plates and determining a set of license plate characters from the image, one of ordinary skilled in the art may refer to U.S. Pat. No. 4,878,248 to Shyu et al.; U.S. Pat. No. 4,817,166 to Gonzalez et al.; and U.S. Pat. No. 5,081,685 to Jones, III et al., each incorporated by reference herein as part of the present disclosure. After the license plate characters have been recognized, the image may be retained for future comparison or analysis, if desired.

Figure 2:
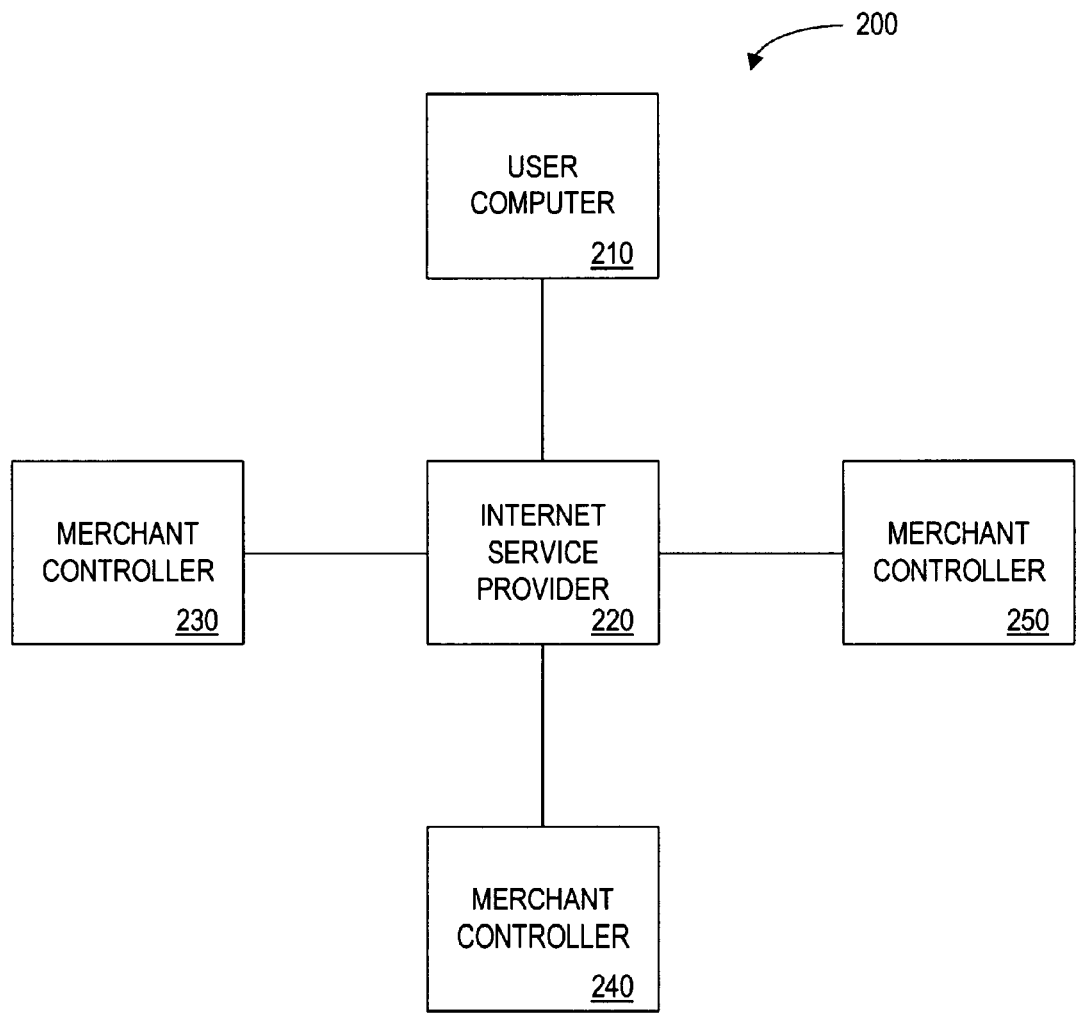
FIG. 2 is a schematic illustration of another embodiment of the present invention involving a plurality of merchants.

Referring to FIG. 2, in an alternate embodiment of the present invention there may be a plurality of merchant controllers, each directing the operations of a different merchant. Furthermore, each merchant controller may be centrally controlled, allowing the merchant controllers to cooperate in a manner described below. A user computer 210 is in communication with an Internet service provider ("ISP") computer 220. The user computer 210 may perform some or all of the functions of the user communication device 110 (FIG. 1). The user computer 210 is typically a personal computer operated by the customer and equipped to access the Internet or other electronic network. The ISP computer 220 is a computer that enables the user computer 210 to access the Internet in a manner known in the art. Accordingly, the ISP computer 220 may be of the type controlled and/or operated by America Online, Prodigy, or Microsoft for offering Internet connectivity and content to users.

The ISP computer 220 is in turn in communication through the Internet with merchant controllers 230, 240 and 250 in a manner known in the art. In another embodiment of the present invention, the user computer 210 may be provided with access to the Internet by another computer besides the ISP computer 220, while the ISP computer 220 may enable the merchant controllers to access the Internet.

As is also known in the art, the merchant controllers 230, 240 and 250 may control "web sites" that may be accessed by the user computer 210 upon entering appropriate commands. Each merchant controller may perform some or all of the functions of the merchant controller 115 (FIG. 1). In particular, each merchant controller may direct the operations of a different store. Although three merchant controllers are shown in FIG. 2, any number of merchant controllers may be in communication with the ISP computer 220 without departing from the spirit and scope of the present invention.

The ISP computer 220 may perform many of the processes described below as performed by a merchant controller, especially those processes that are performed for more than one merchant controller. The ISP computer 220 may also store data that is used by more than one merchant controller. Accordingly, the ISP computer may centrally control the merchant controllers, as described in detail below.

Referring to FIG. 3, reference numeral 300 indicates a more detailed illustration of the merchant controller 115 (FIG. 1) in a single-store embodiment of the present invention. In an embodiment of the present invention involving a plurality of stores, reference numeral 300 indicates a more detailed illustration of the ISP computer 220 (FIG. 2) which may centrally control a plurality of merchant controllers.

A processor 302 that comprises one or more conventional microprocessors such as the Intel® Pentium® microprocessor is in communication with a data storage device 304, such as an appropriate combination of magnetic, optical and/or semiconductor memory. The processor 302 and the storage device 304 may each be (i) located entirely within a single computer or other computing device; (ii) connected to each other by a remote communication medium, such as a serial port cable, telephone line or radio frequency transceiver; or (iii) a combination thereof. For example, reference numeral 300 may represent one or more computers that are connected to a remote computer for maintaining databases.

The processor 302 is also in communication with an input device 306, a printer 308 and a display device 310. The input device 306 may comprise a keypad for transmitting input signals to the processor 302. Other types of input devices are known to those skilled in the art. The printer 308 is for registering indicia on paper or other material. The display device 310 is operative to display at least alphanumeric characters, and thus may be any of a number of known video monitors, liquid crystal displays ("LCD") or light emitting diode ("LED") displays. Many types of input devices and display devices are known to those skilled in the art, and need not be described in detail herein.

The storage device 304 stores a control program 320 for controlling the processor 302. The processor 302 performs instructions of the control program 320 and thereby operates in accordance with the present invention and particularly in accordance with the methods described in detail herein. The control program 320 furthermore includes program elements that may be necessary, such as an operating system and "device drivers" for allowing the processor 302 to interface with computer peripheral devices, such as the input device 306, the printer 308 and the display device 310. Appropriate device drivers and other necessary program elements are known to those skilled in the art and need not be described in detail herein.

The storage device 304 also stores (i) a merchant database 322, (ii) a remote order database 324, (iii) an order database 326, (iv) a complimentary item database 328, (v) a custom price database 330, and (vi) a default order database 332. In addition, other devices (e.g. the merchant controllers) may obtain information from the databases stored by the storage device 304. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 4:
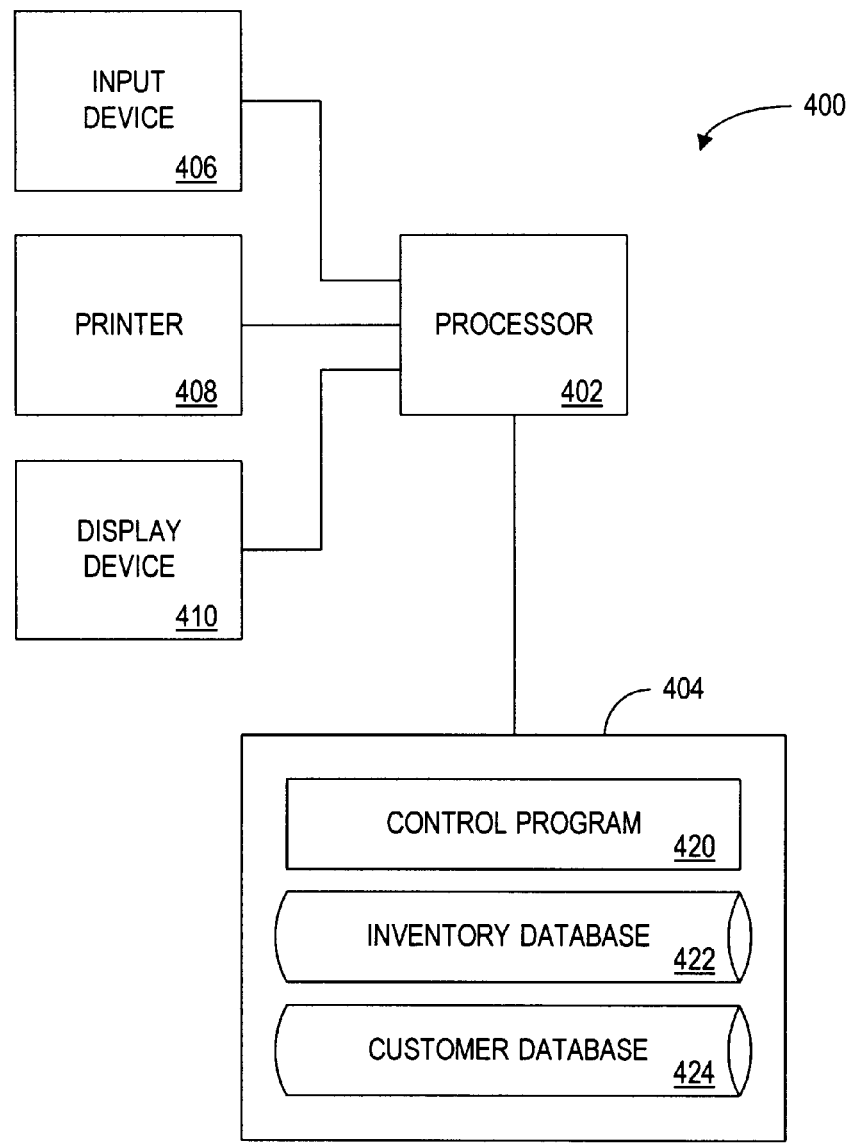
FIG. 4 is a schematic illustration of another embodiment of a merchant controller.

Referring to FIG. 4, in an embodiment of the present invention involving a plurality of stores, reference numeral 400 indicates a more detailed illustration of a merchant controller. A processor 402 comprises one or more conventional microprocessors such as the Intel® Pentium® microprocessor. The processor 402 is in communication with a data storage device 404, such as an appropriate combination of magnetic, optical and/or semiconductor memory. The processor 402 and the storage device 404 may each be (i) located entirely within a single computer or other computing device; (ii) connected to each other by a remote communication medium, such as a serial port cable, telephone line or radio frequency transceiver; or (iii) a combination thereof. For example, reference numeral 400 may represent one or more computers that are connected to a remote computer for maintaining databases.

The processor 402 is also in communication with an input device 406, a printer 408 and a display device 410. The input device 406 preferably comprises a keypad for transmitting input signals to the processor 402. The printer 408 is for registering indicia on paper or other material. The display device 410 is operative to display at least alphanumeric characters to the customer and/or cashier, and thus may be any of a number of known video monitors, liquid crystal displays ("LCD") or light emitting diode ("LED") displays. Many types of input devices, printers and display devices are known to those skilled in the art, and need not be described in detail herein.

The storage device 404 stores a control program 420 for controlling the processor 402. The processor 402 performs instructions of the control program 420 and thereby operates in accordance with the present invention and particularly in accordance with the methods described in detail herein. The control program 420 furthermore includes program elements that may be necessary, such as an operating system and "device drivers" for allowing the processor 402 to interface with computer peripheral devices. Appropriate device drivers and other necessary program elements are known to those skilled in the art and need not be described in detail herein.

The storage device 404 also stores (i) an inventory database 422, and (ii) a customer database 424. In another embodiment, one or more POS terminals may store one or more of the databases 422 and 424. The databases 422 and 424 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 5:
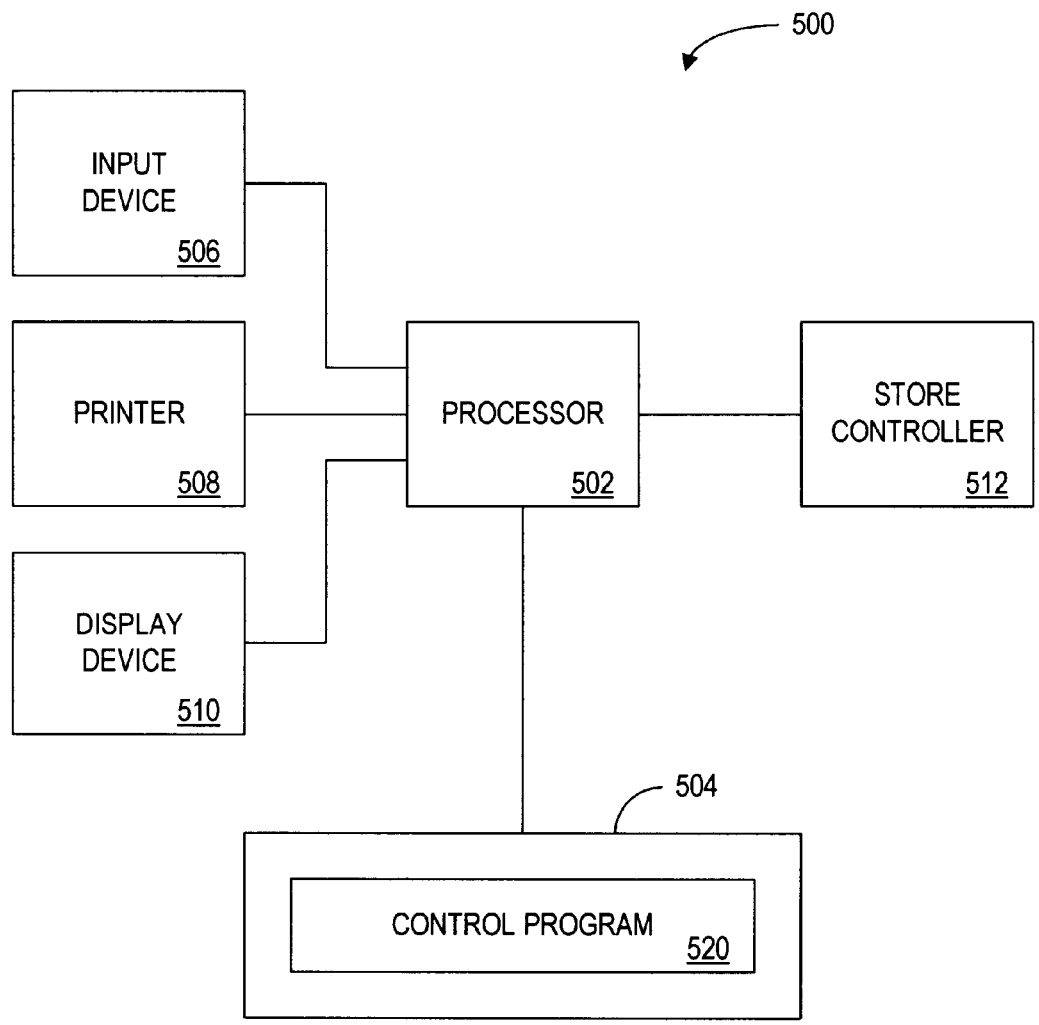
FIG. 5 is a schematic illustration of a POS terminal of the application of FIG. 1.

Referring to FIG. 5, a POS terminal 500 is descriptive of any or all of the POS terminals 120, 125 and 130 (FIG. 1). The POS terminal 500 may be, for example, the NCR 7454 manufactured by NCR Corporation or the IBM 4683 manufactured by International Business Machines. The POS terminal 500 includes a processor 502 that comprises one or more conventional microprocessors such as the Intel® Pentium® microprocessor. The processor 502 is in communication with a data storage device 504, such as an appropriate combination of magnetic, optical and/or semiconductor memory. The processor 502 and the storage device 504 may each be (i) located entirely within a single computer or other computing device; (ii) connected to each other by a remote communication medium, such as a serial port cable, telephone line or radio frequency transceiver; or (iii) a combination thereof. For example, the POS terminal 500 may comprise one or more computers that are connected to a remote computer for maintaining databases.

The processor 502 is also in communication with an input device 506, a printer 508 and a display device 510. The input device 506 may comprise one or more of (i) a keypad for transmitting input signals to the processor 502; (ii) a card reader for reading magnetically-encoded information on cards passed therethrough, such as credit cards, frequent shopper cards and identity cards; (iii) an optical scanner for reading bar codes, such as bar codes registered on items of inventory; and (iv) a touch screen for generating signals that indicate when and where the screen has been touched, pressed or actuated. The printer 508 is for registering indicia on paper or other material, thereby printing receipts, coupons and vouchers as commanded by the processor 502. The display device 510 is operative to display at least alphanumeric characters to the customer and/or cashier, and thus may be any of a number of known video monitors, liquid crystal displays ("LCD") or light emitting diode ("LED") displays. Many types of input devices, printers and display devices are known to those skilled in the art, and need not be described in detail herein.

The storage device 504 stores a control program 520 for controlling the processor 502. The processor 502 performs instructions of the control program 520 and thereby operates in accordance with the present invention and particularly in accordance with the methods described in detail herein. The control program 520 furthermore includes program elements that may be necessary, such as an operating system and "device drivers" for allowing the processor 502 to interface with computer peripheral devices. Appropriate device drivers and other necessary program elements are known to those skilled in the art and need not be described in detail herein.

Referring to FIG. 6, a table 600 illustrates an embodiment of the merchant database 322 (FIG. 3). The table 600 includes entries 602, 604 and 606, each of which describes a merchant that owns, operates or controls a merchant controller. It will be understood by those skilled in the art that the table 600 may include any number of entries. The table 600 also defines fields for each of the entries 602, 604 and 606, which specify (i) a merchant identifier 620 for uniquely identifying the merchant, (ii) a name 622 of the merchant, (iii) an address 624 of the merchant, (iv) a standard industry classification ("SIC") code 626 of the merchant which defines a merchant class of the merchant.

Referring to FIG. 7, a table 700 illustrates a record of the customer database 424 (FIG. 4). In such an embodiment, the customer database 424 typically includes a plurality of records, each of which includes information about a customer. Such information is typically collected during transactions with the customer. The table 700 includes a set of license plate characters 702. In one embodiment, the license plate characters include (i) alphanumeric characters corresponding to those on the license plate of the customer's vehicle, and (ii) a two-letter code indicating the state of registration of the license plate. Although one set of license plate characters is shown in FIG. 7, a record of the customer database 424 may include a plurality of sets of license plate characters. Such an embodiment is advantageous in that a customer that drives more than one vehicle may be identified by the license plate of each of his vehicles.

The table 700 also includes a name 704 and address 706 of the customer, if available. The table 700 also includes a credit card number 708 that indicates a credit card account that has been used by the customer in a previous transaction, and a default order 710 for the customer, which is described in detail below.

The table 700 also includes entries 712 and 714, each of which describes a transaction in which the customer participated. It will be understood by those skilled in the art that the table 700 may include any number of entries. The table 700 also defines fields for each of the entries 712 and 714, which specify (i) a transaction identifier 720 that uniquely identifies the transaction, (ii) a merchant identifier 722 that identifies a merchant with which the customer participated in the transaction, (iii) a date and time 724 of the transaction, and (iv) a purchase price 726 of the transaction. The transaction data (e.g. items ordered, date and time of order, purchase price of order) that represents transactions may also be stored in a transaction database.

Referring to FIG. 8, a table 800 illustrates an embodiment of the inventory database 422 (FIG. 4). The table 800 includes entries 802, 804, 806 and 808, each of which describes an item of inventory that is sold by a merchant. It will be understood by those skilled in the art that the table 800 may include any number of entries. The table 800 also defines fields for each of the entries 802, 804, 806 and 808, which specify (i) an inventory identifier 820 for uniquely identifying the item of inventory, (ii) a description 822 of the item of inventory, and (iii) a price 824 for which the item of inventory is sold.

Referring to FIG. 9, a table 900 illustrates an embodiment of the remote order database 324 (FIG. 3). The table 900 includes entries 902, 904 and 906, each of which describes an order that was placed by a customer that was located remotely from the merchant. It will be understood by those skilled in the art that the table 900 may include any number of entries. The table 900 also defines fields for each of the entries 902, 904 and 906, which specify (i) a remote order identifier 920 for uniquely identifying the remote order, (ii) a date and time 922 when the items were remotely ordered, (iii) the license plate characters 924 that will identify the customer's vehicle when the customer claims his order, (iv) the items ordered 926, and (v) the merchant identifier 928 of the merchant, if any with which the order was placed.

Figure 10:
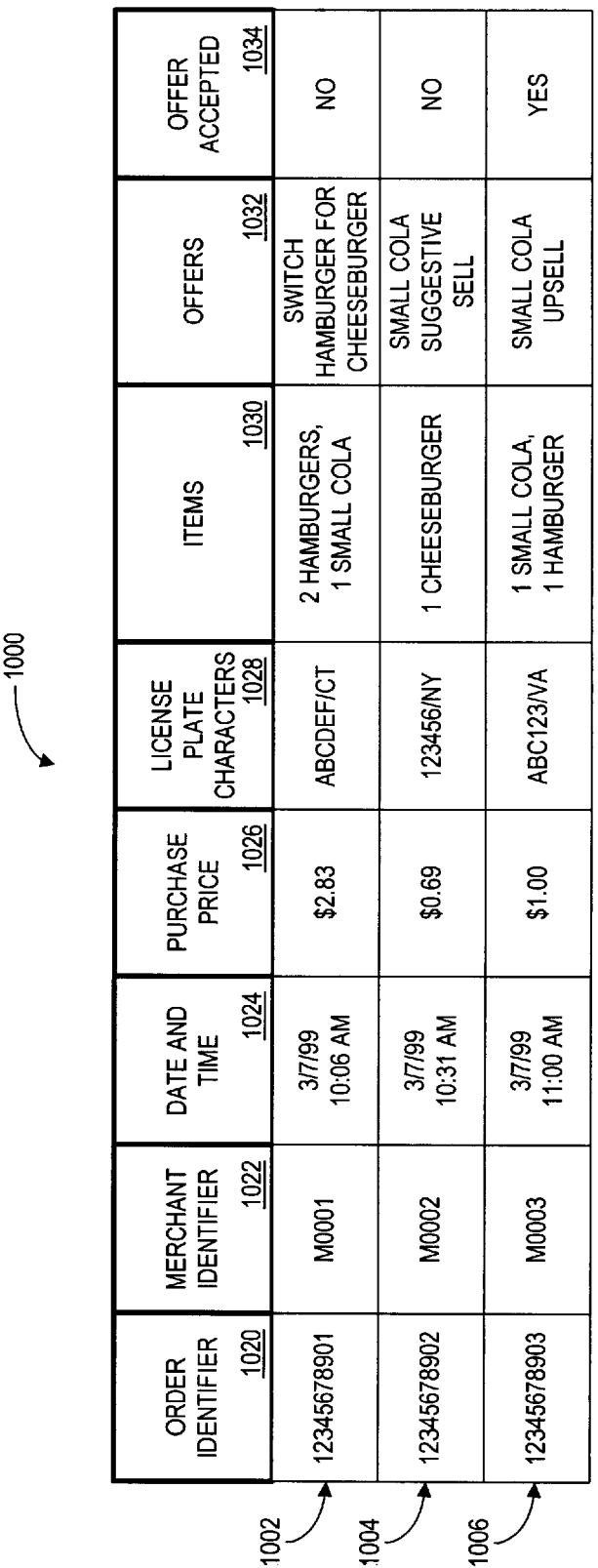
FIG. 10 is a schematic illustration of an embodiment of an order database of the apparatus of FIG. 1.

Referring to FIG. 10, a table 1000 illustrates an embodiment of the order database 326 (FIG. 3). The table 1000 includes entries 1002, 1004 and 1006, each of which describes a placed order that was consummated by having the customer purchase and receive the ordered items. It will be understood by those skilled in the art that the table 1000 may include any number of entries. The table 1000 also defines fields for each of the entries 1002, 1004 and 1006, which specify (i) an order identifier 1020 for uniquely identifying the order, (ii) the merchant identifier 1022 of the merchant with which the order was consummated, (iii) a date and time 1024 when the items were received by the customer, (iv) a purchase price 1026 paid for the order, (v) the license plate characters 1028 that identify the customer's vehicle, (vi) the items purchased 1030, (vii) offers 1032, if any, that were provided to the customer, and (viii) an indication of whether the offer was accepted 1034.

Referring to FIG. 11, a table 1100 illustrates a record of an embodiment of the complimentary item database 328 (FIG. 3). The complimentary item database 328 typically includes a plurality of such records, each describing one or more items that a customer is entitled to free of charge. The table 1100 includes a customer identifier 1102 that identifies the customer. The table 1100 also includes an entry 1104 that describes an item that the customer is entitled to free of charge. It will be understood by those skilled in the art that the table 1100 may include any number of entries. The table 1100 also defines fields for each entry, which specify (i) a complimentary item identifier 1120 that uniquely identifies the customer's complimentary item, (ii) a number 1122 of the complimentary items remaining to be received by the customer, (iii) a date 1124 that the complimentary item was last received by the customer, and (iv) a time period 1126 within which no more than one complimentary item may be received by the customer.

Referring to FIG. 12, a table 1200 illustrates a record of an embodiment of the custom price database 330 (FIG. 3). The custom price database 330 typically includes a plurality of such records, each describing one or more items that a customer may purchase for a price different than the retail price. Typically, each custom price is generated for an item based on the customer information such as past transactions of the customer. For example, a customer may be afforded a custom price for an item he purchases a predetermined number of times.

The table 1200 includes a customer identifier 1202 that identifies the customer. The table 1200 also includes entries 1204 and 1206 that each describe an item that the customer may purchase for a "custom price". It will be understood by those skilled in the art that the table 1200 may include any number of entries. The table 1200 also defines fields for each of the entries 1204 and 1206, which specify (i) an inventory identifier 1220 that uniquely identifies the item, (ii) a description 1222 of the item, (iii) a custom price 1224 of the item, and (iv) any restrictions 1226 that must be satisfied in order for the customer to be able to pay the custom price.

Referring to FIG. 13, a table 1300 illustrates a record of an embodiment of the default order database 332 (FIG. 3). The default order database 332 typically includes a plurality of such records, each describing default orders that are offered to a customer upon recognizing the customer. The table 1300 includes a customer identifier 1302 that identifies the customer. The table 1300 also includes entries 1304, 1306 and 1308 that each describe a default order and conditions under which the default order is offered to the customer. It will be understood by those skilled in the art that the table 1300 may include any number of entries. The table 1300 also defines fields for each of the entries 1304, 1306 and 1308, which specify (i) the items, also known as default items, included in the default order 1320; and (ii) an indication of when the default order is "active" 1322 (to be offered). The default order database 332 may further store default items that are customized versions of conventional items (e.g. a cheeseburger with extra cheese and no ketchup). Such default items could also be displayed by the menu board display 135 (FIG. 1) to the customer.

In general, information stored about a customer is considered to be stored in a "customer record". Accordingly, each of a plurality of customer records corresponds to a customer. Information that is stored in the customer database 424 may be considered part of a respective customer record. In addition, the data stored in the complimentary item database 328, the custom price database 330 and/or the default order database 332 may also be considered part of a respective customer record. Similarly, the data stored in the complimentary item database 328, the custom price database 330, and the default order database 332 may instead be stored in the customer database 424. Further data may be stored for each customer. For example, each time the an image of a license plate is generated, the image may be stored in the customer record for future comparison and/or analysis.

Figure 14:
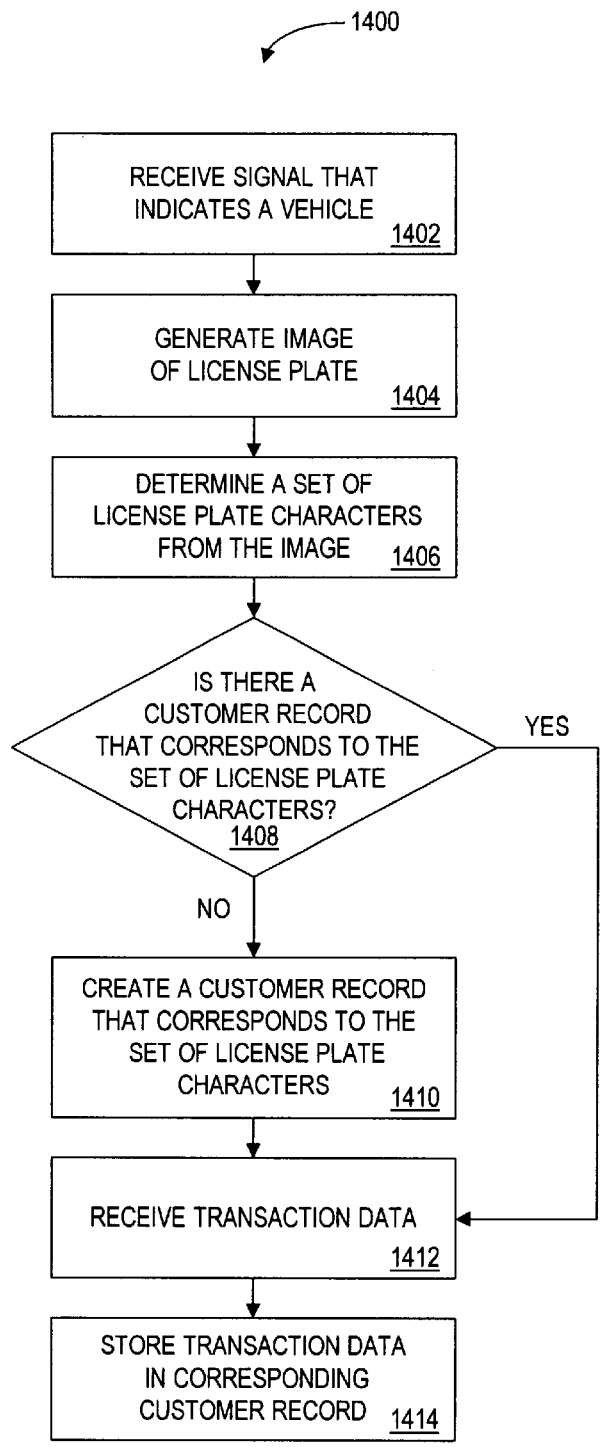
FIG. 14 is a flow chart illustrating an embodiment of a method for maintaining a database using license plate scanning.

Referring to FIG. 14, a flow chart 1400 illustrates an embodiment of a method provided in accordance with the present invention. A signal is received from the vehicle sensors 140 and 145 (FIG. 1), in which the signal generally indicates the presence of a vehicle in the drive-through (step 1402). The 140 and 145 vehicle sensors transmit the signal to the merchant controller 115 (FIG. 1). In response, merchant controller 115 directs the imaging sampler 160 to focus on and generate an image of the license plate of the vehicle (step 1404). The imaging sampler 160 in turn transmits a signal representing the image to the merchant controller 115. The merchant controller 115 determines from the image a set of license plate characters of the license plate (step 1406). The merchant controller 115 may perform optical character recognition (OCR) on the image of in order to determine the set of license plate characters. OCR is a process in which an image of characters is analyzed to determine the shapes of the characters by detecting patterns of dark and light. Once the shapes are determined, character recognition methods (pattern matching with stored sets of characters) are used to translate the shapes into computer text. Sometimes OCR is done with special readers, but often it is done using a standard imaging sample and specialized software. The merchant controller 115 may also determines the state of registration of the license plate, for example, with reference to the colors of the license plate.

The customer database 424 (FIG. 4) is searched to determine if there is a customer record that corresponds to the set of license plate characters (step 1408). Typically, if the vehicle has never had its license plate scanned as described above, there will be no corresponding customer record. If no customer record exists, then a customer record is created (step 1410). The created customer record will correspond to the set of license plate characters. For example, referring again to the table 700 (FIG. 7), a new record of the customer database 424 may be created and the set of license plate characters may be stored in the field 702 of the record. Transaction data is received (step 1412) and stored in the corresponding customer record (step 1414).

Figure 15A:
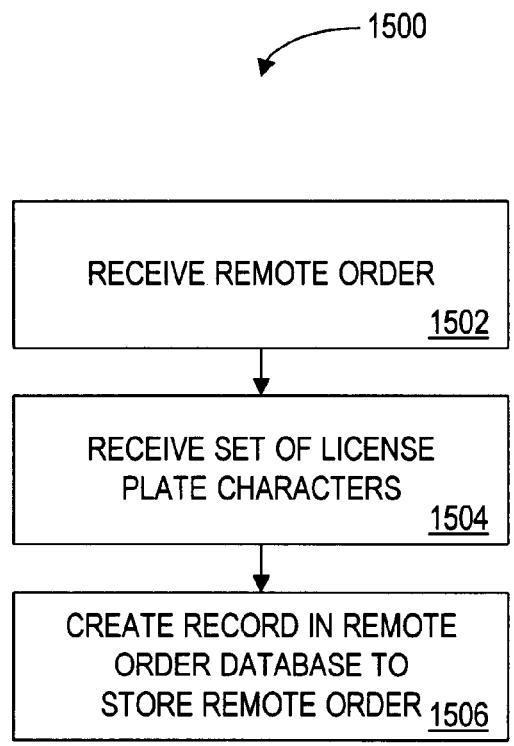
FIG. 15A is a flow chart illustrating an embodiment of a method for receiving a remote order.

Referring to FIG. 15A, a flow chart 1500 illustrates an embodiment of a method provided in accordance with the present invention. In particular, the illustrated method is performed when a customer located remotely from the store places an order. The merchant controller 115 (FIG. 1) receives a remote order (step 1502) from the user communication device 110 (FIG. 1). For example, a customer may submit a remote order using a computer to access a web site, or using a telephone to access an interactive voice response unit ("VRU"). The merchant controller 115 also receives from the customer the set of license plate characters (step 1504) to identify the customer when the order is collected. The customer may further specify, for example, an intended time of collection of the order and/or a merchant from which to collect the order if more than one merchant may satisfy the order. In response to the information received from the customer, a record is created in the remote order database 324 (FIG. 3). The record would be identified by the set of license plate characters and would indicate the remote order.

Figure 15B:
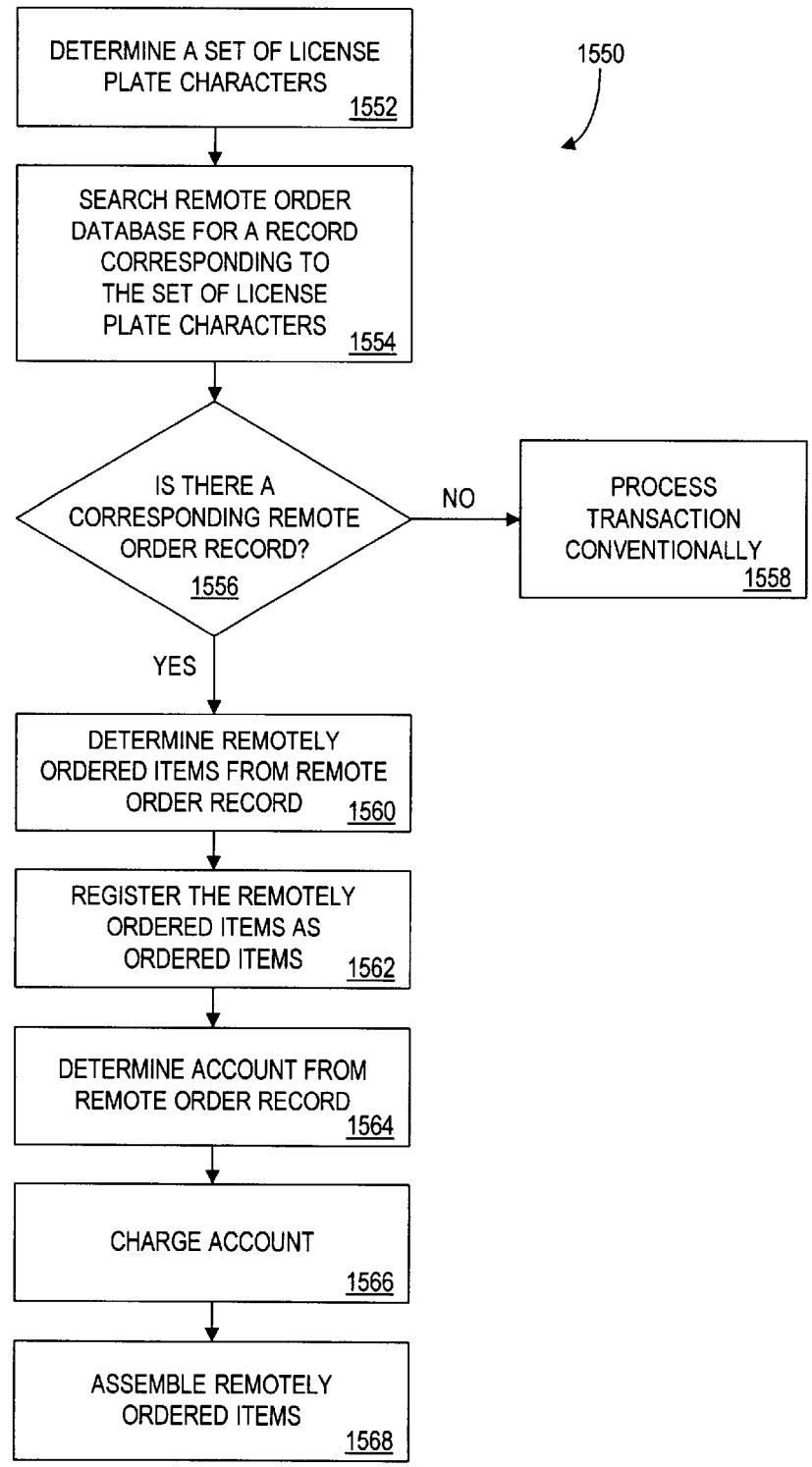
FIG. 15B is a flow chart illustrating an embodiment of a method for further processing a remote order.

Referring to FIG. 15B, a flow chart 1550 illustrates an embodiment of a method provided in accordance with the present invention. In particular, the illustrated method is performed when a customer collects a remotely-placed order. The merchant controller 115 determines a set of license plate characters of a customer's vehicle (step 1552) as described above. The remote order database is then searched for a record corresponding to this set of license plate characters (step 1554). If it is determined that there is no such corresponding record (step 1556), then the transaction is processed conventionally (step 1558).

Otherwise, the remotely ordered items are determined from the corresponding record of the remote order database (step 1560). The remotely ordered items are then registered as ordered items (step 1562) as if the customer had placed the order at the drive-through. The credit card account (or other financial account) of the customer, if any, is also determined from the remote order record (step 1564). Alternatively, the account of the customer may be determined by referring to a record of the customer database, if the customer had previously used his credit card account to pay for a transaction. The account is charged (step 1566) (or payment is otherwise rendered) in an amount equal to the purchase price of the order, and the merchant controller outputs a command to assemble the remotely ordered items (step 1568), if necessary, to the kitchen staff in a manner known in the art.

Figure 16A:
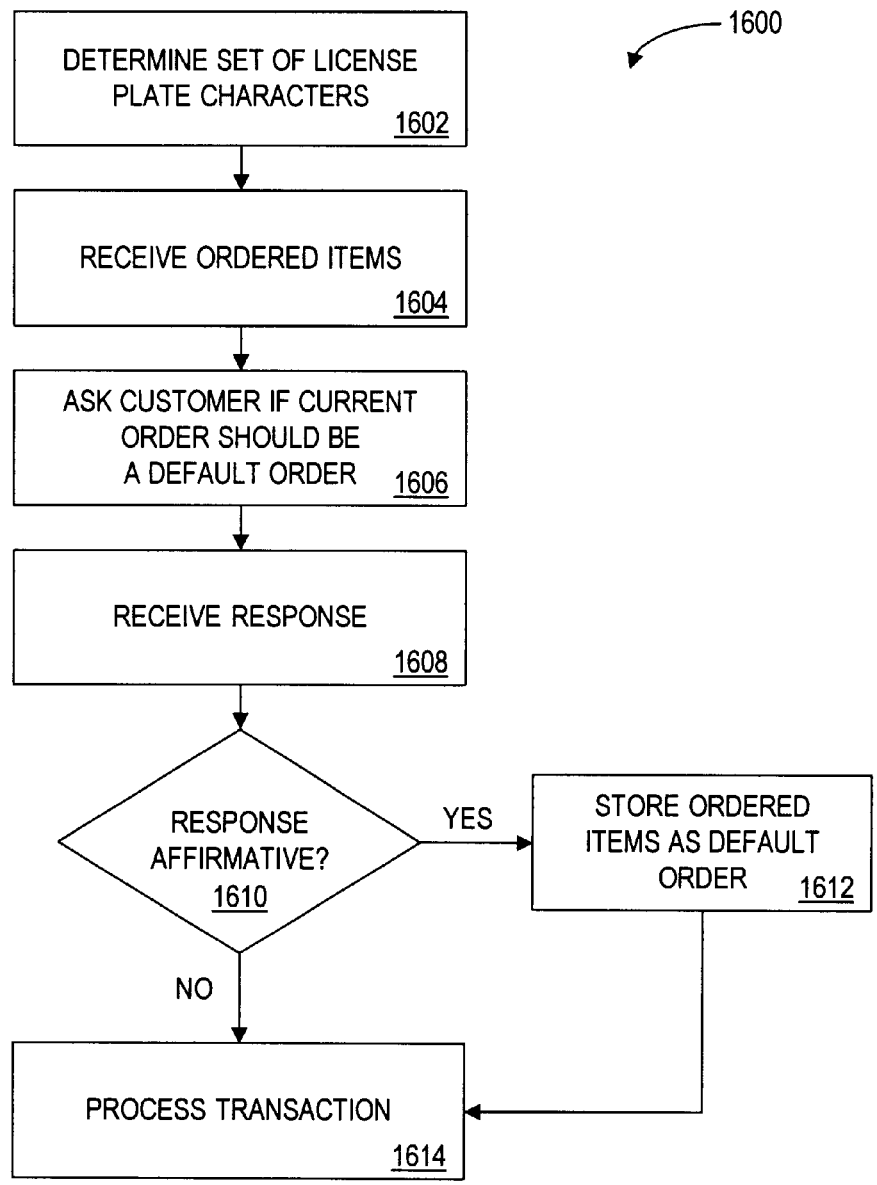
FIG. 16A is a flow chart illustrating an embodiment of a method for establishing a default order.

Referring to FIG. 16A, a flow chart 1600 illustrates an embodiment of a method provided in accordance with the present invention. In particular, the illustrated method is performed when a customer desires to make his current order the "default order", thereby allowing the merchant to sell him his desired items without specifying those items again. The merchant controller 115 (FIG. 1) determines a set of license plate characters of the customer's vehicle (step 1602) and receives an indication of the items the customer is ordering (step 1604) as described above. The customer is asked if his current order should be his default order (step 1606). The customer responds, and the response is received (step 1608) by, for example, actuating a key on a POS terminal. If the customer response is affirmative (step 1610), then the ordered items are stored as the default order of the customer (step 1612). For example, the corresponding customer record may indicate the default order in the field 710 (FIG. 7). Alternatively, an appropriate record of the default order database 332 (FIG. 3) may be created or adjusted to reflect the default order, as well as any restriction on when the default order would be active. The remainder of the transaction is then processed as described above (step 1614). In an alternate embodiment, each item of the order may be designated as a "default item", rather than the entire order being designated a "default order".

Figure 16B:
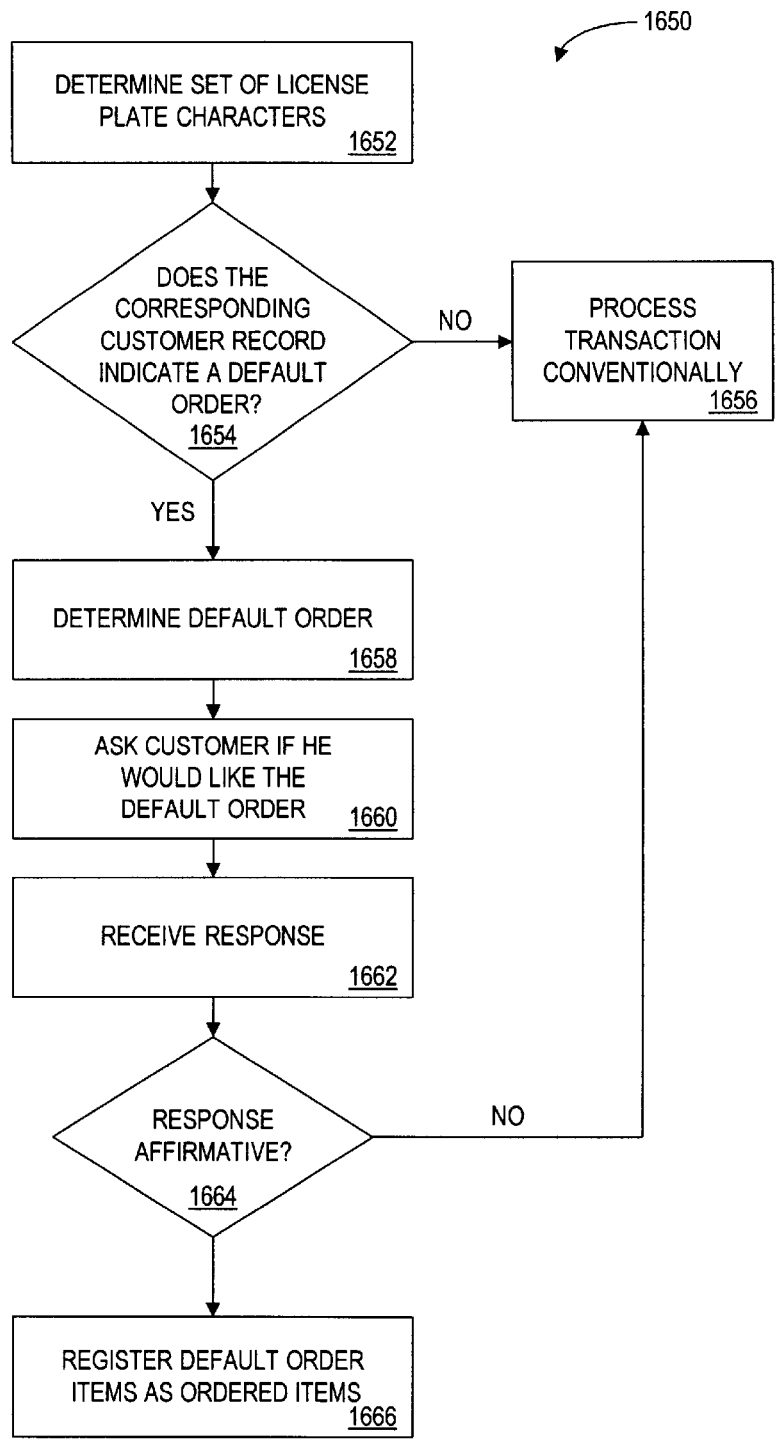
FIG. 16B is a flow chart illustrating an embodiment of a method for processing a default order.

Referring to FIG. 16B, a flow chart 1650 illustrates an embodiment of a method provided in accordance with the present invention. In particular, the illustrated method is performed when a default order is registered as the customer's order. The merchant controller 115 (FIG. 1) determines a set of license plate characters of a customer's vehicle (step 1652) as described above. If the corresponding customer record does not indicate that the customer has a default order (step 1654), then the transaction is processed conventionally (step 1656).

Otherwise, the default order of the customer is determined (step 1658) and the customer is asked whether he would like the default order (step 1660). The default order may be read by the cashier to the customer, and/or the default order may be displayed on the menu board display 135 (FIG. 1). The customer's response is received (step 1662) and if it is determined that the response is affirmative (step 1664) then the items of the default order are registered as ordered items (step 1666).

Figure 17:
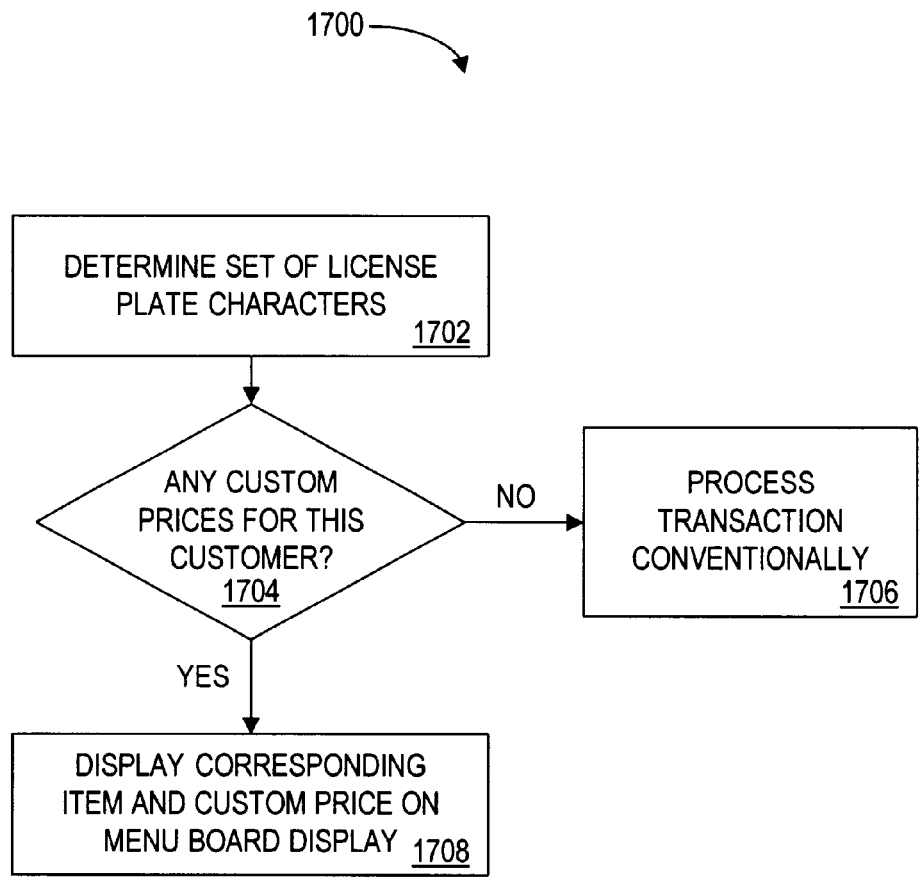
FIG. 17 is a flow chart illustrating an embodiment of a method for displaying custom prices of a customer.

Referring to FIG. 17, a flow chart 1700 illustrates an embodiment of a method provided in accordance with the present invention. In particular, the illustrated method is performed when a customer is able to purchase an item for a custom price, which is typically less than the retail price of the item. The merchant controller 115 (FIG. 1) determines a set of license plate characters of a customer's vehicle (step 1702) as described above. If the corresponding customer record does not indicate that the customer has one or more custom prices (step 1704), then the transaction is processed conventionally (step 1706). Otherwise, the corresponding items and custom prices are displayed on the menu board display (step 1708). If the customer chooses to order any of the items having custom prices, then the custom prices are charged rather than the retail prices.

Figure 18:
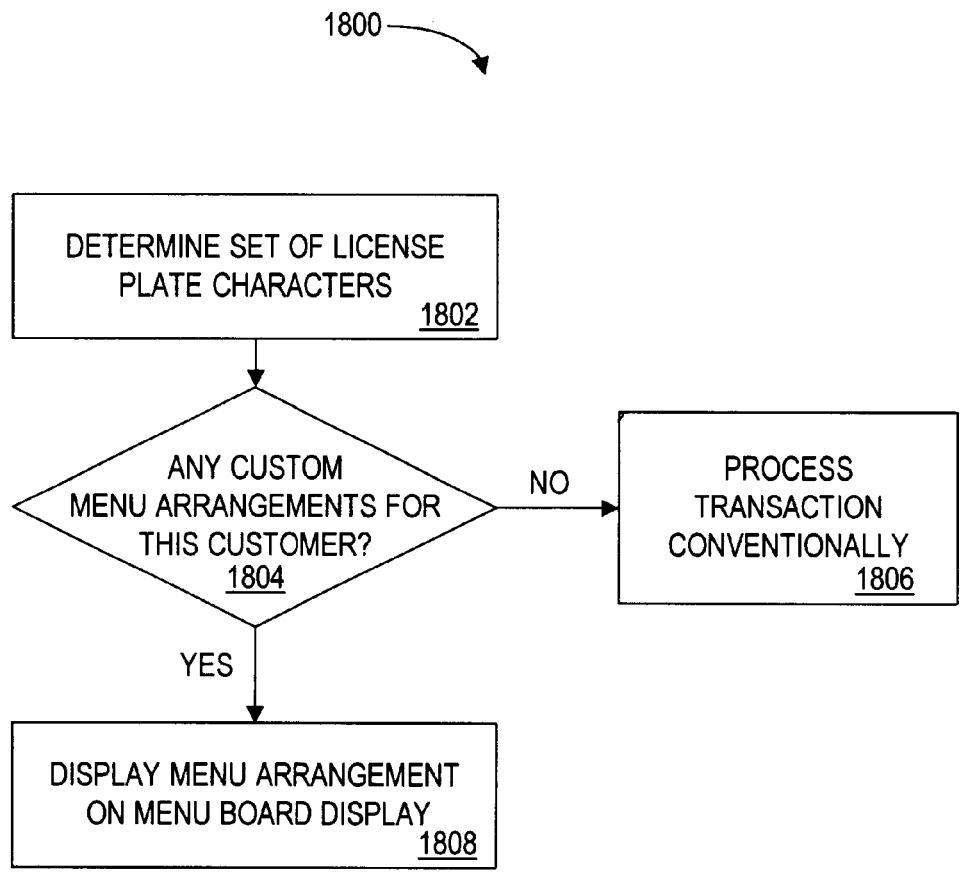
FIG. 18 is a flow chart illustrating an embodiment of a method for displaying custom menu arrangements of a customer.

Referring to FIG. 18, a flow chart 1800 illustrates an embodiment of a method provided in accordance with the present invention. In particular, the illustrated method is performed when a customer has an associated custom menu arrangement. For example, based on past transactions of the customer, the most frequently purchased items may be displayed more prominently (e.g. at the top of the menu board display 135 or centrally located on the menu board display 135).

The merchant controller 115 (FIG. 1) determines a set of license plate characters of a customer's vehicle (step 1802) as described above. If the corresponding customer record does not indicate that the customer has a custom menu arrangement (step 1804), then the transaction is processed conventionally (step 1806). Otherwise, the menu board display displays the items and prices according to the custom arrangement (step 1808).

Figure 19:
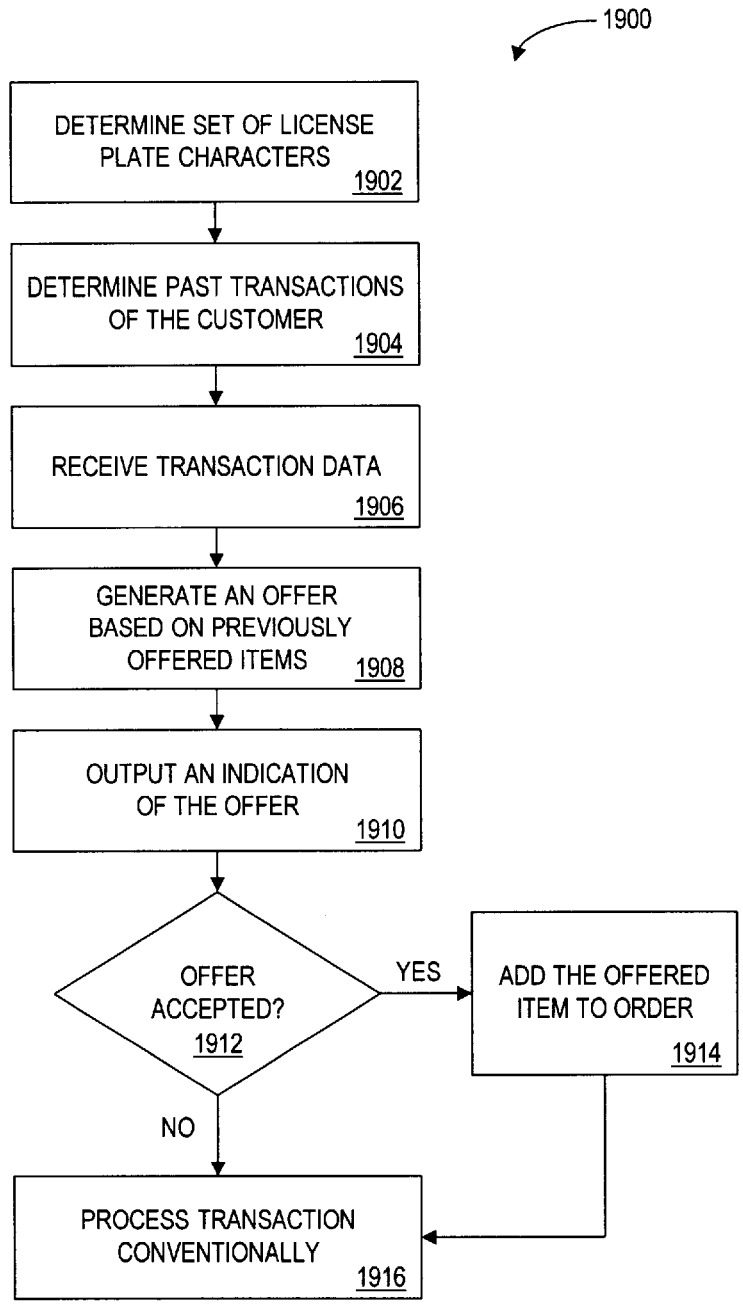
FIG. 19 is a flow chart illustrating an embodiment of a method for generating an offer for a customer based on past transactions of the customer.

Referring to FIG. 19, a flow chart 1900 illustrates an embodiment of a method provided in accordance with the present invention. In particular, the illustrated method is performed to provide an offer to a customer based on his past transactions. For example, based on past transactions of the customer, the most frequently purchased items may be offered if it has not been ordered presently, or an item that has never been purchased may be offered.

The merchant controller 115 (FIG. 1) determines a set of license plate characters of a customer's vehicle (step 1902) as described above. The past transactions of the customer are determined (step 1904), typically by referring to the customer database 424 (FIG. 4). Transaction data is then received (step 1906) as described above. An offer that is based on previously ordered items is then generated (step 1908). For example, if a previously-ordered item does not match any of the ordered items, that previously-ordered item may be offered to the customer. Similarly, the offer may be for an item that has never been ordered. An indication of the offer is output (step 1910), for example by displaying text on a POS terminal which may be read by the cashier. If the offer is accepted (step 1912), then the offered item is added to the order (step 1914). Then, the transaction is processed conventionally (step 1916).

Figure 20:
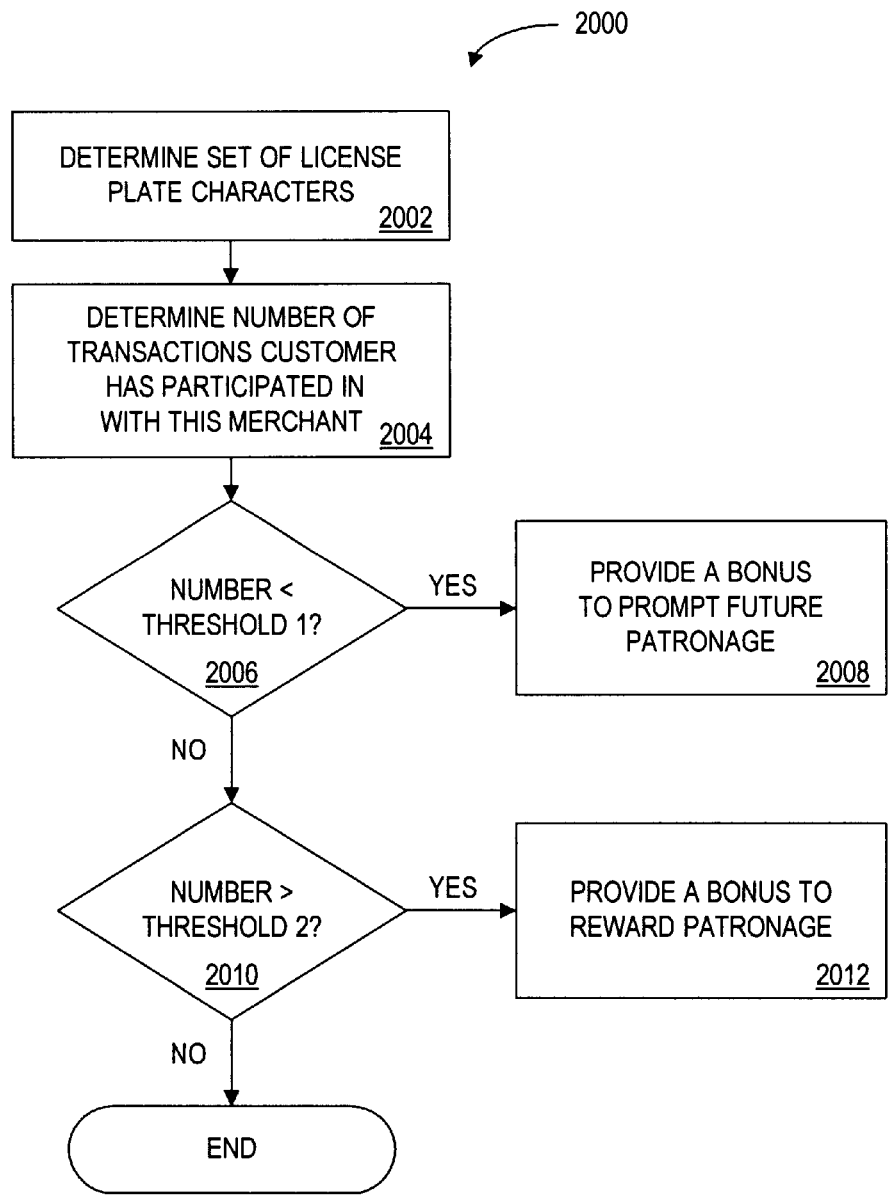
FIG. 20 is a flow chart illustrating an embodiment of a method for providing a bonus to a customer based on his past transactions.

Referring to FIG. 20, a flow chart 2000 illustrates an embodiment of a method provided in accordance with the present invention. In particular, the illustrated method is performed to determine if a customer is a frequent patron of the merchant or if the customer has rarely or never frequented the merchant. The merchant controller 115 (FIG. 1) determines a set of license plate characters of a customer's vehicle (step 2002) as described above. The merchant controller 115 then determines the number of past transactions (step 2004) that the customer has had with this merchant (step 2004), typically by referring to the customer database 424 (FIG. 4).

If the number of transactions is below a first predetermined threshold (step 2006), then the customer is an infrequent customer, and it would be advantageous to prompt future patronage. Accordingly, the customer may be provided with a bonus (step 2008) such as a coupon redeemable at the merchant. In an alternate embodiment, the customer may be provided with an offer, such as an offer for a supplementary product in exchange for an amount of change due him. If the number of transactions is above a second predetermined threshold (step 2010), then the customer is a frequent customer, and it would be advantageous to reward the customer for his patronage. Accordingly, the customer may be provided with a bonus (step 2012) such as a discount.

In a related embodiment, the number of transactions of the customer and the number of merchants visited by the customer may be determined from the customer record. It can be especially advantageous to determine if and how often the customer has participated in transactions with any of a set of merchants, such as different franchisees of a particular retailer. If the customer has participated in transactions with more than one merchant of the set more than a predetermined number of times, a bonus could be provided to prompt future patronage at one of the merchants. For example, if a customer has participated in transactions with more than one merchant of the group of related franchisees more than three times per month, a bonus could be provided to prompt future patronage at one particular franchisee. Other variations will be apparent to those skilled in the art.

The above-described embodiment is especially advantageous when a set of stores are commonly owned and the owner would like customers to be directed to one of the stores (e.g. the one with the lowest sales). Often, an owner of several stores all within a short distance of the others will find one store to suffer much lower sales than the rest. The owner could assure that customers would be provided with a bonus to prompt future patronage at one, but not the remaining, commonly-owned stores.

Figure 21:
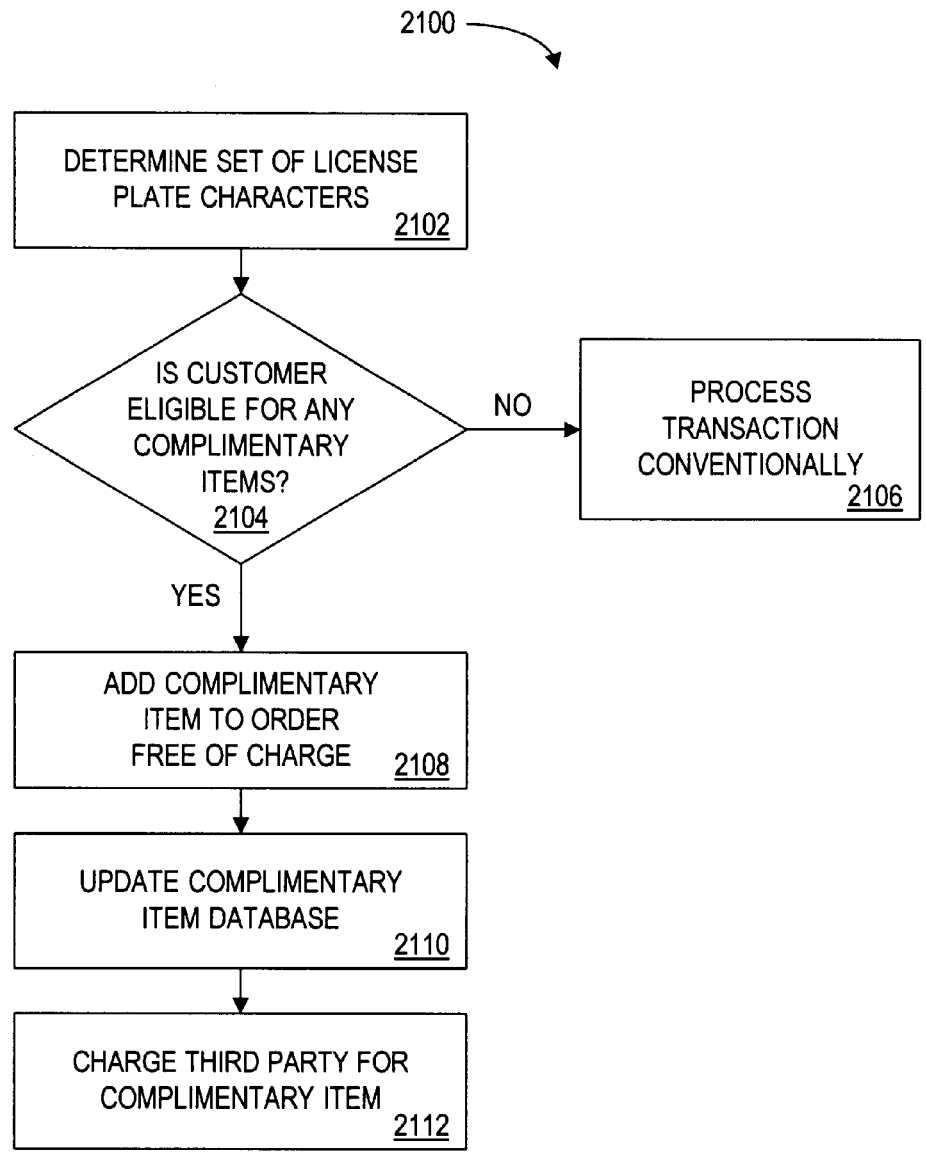
FIG. 21 is a flow chart illustrating an embodiment of a method for awarding complimentary items to a customer.

Referring to FIG. 21, a flow chart 2100 illustrates an embodiment of a method provided in accordance with the present invention. In particular, the illustrated method is performed to allow a customer to periodically collect items that are complimentary or prepaid. The merchant controller 115 (FIG. 1) determines a set of license plate characters of a customer's vehicle (step 2102) as described above. The merchant controller 115 then determines if the customer is eligible for any complimentary items (step 2104), typically by referring to the appropriate record of the complimentary item database 328 (FIG. 3). For example, the number remaining must be greater than zero and no complimentary item may have been received within the specified time period. If the customer is not eligible, the transaction is processed conventionally (step 2106).

Otherwise, the complimentary item is added free of charge to the order (step 2108), thereby registering the complimentary item as an ordered item. The appropriate record of the complimentary item database 328 is updated (step 2110) to reflect the new number remaining (field 1122) and the new date the complimentary item was last received (step 1124). If desirable, a third party is charged for the complimentary item (step 2112). For example, a set of complimentary items may be purchased for the customer on behalf of a third party who is charged initially or when the complimentary items are received. In another embodiment, the set of complimentary items may have been purchased in advance by the customer. Accordingly, no third party would need to be charged.

Customers may change license plates. For example, a customer may buy another vehicle that has a new set of license plate characters on its license plate. Rather than having a new customer record created for the new set of license plate characters, the customer may associate the new set of license plate characters with the customer record that corresponds to the old set of license plate characters. For example, the new set of license plate characters may be stored in the field 702 (FIG. 7) of the corresponding customer record. The new license plate characters may be entered in a number of ways, such as by the customer via a kiosk or a web site, or by a cashier operating a POS terminal.

The present invention may be used to collect information about customers and their patronage. Such information may in turn be advantageously employed by various merchants to determine "repeat customers". The above-described databases may be searched to determine, for example, how many customers visit the store more than once per month and how many of the customers that visited the store in the current month had also been to the store last month. In such an embodiment, the imaging scanner and vehicle sensors may be located in an alley through which vehicles must pass to enter a parking lot. Thus, even customers that do not place orders in a drive-through may have their license plates read and processed as described above.

Although the present invention has been described with respect to a preferred embodiment thereof, those skilled in the art will note that various substitutions may be made to those embodiments described herein without departing from the spirit and scope of the present invention.

What is claimed is:

1. A method for maintaining a database using license plate scanning, comprising:

generating an image of a license plate of a customer in a drive through;

determining a set of license plate characters from the image, the set of license plate characters identifying the customer; and providing customized service to the customer.

2. An apparatus for maintaining a database using license plate scanning, comprising:

means for generating an image of a license plate of a customer in a drive through;

means for determining a set of license plate characters from the image, the set of license plate characters identifying the customer; and means for providing customized service to the customer.

3. An apparatus for maintaining a database using license plate scanning, comprising:

a storage device; and a processor connected to the storage device, the storage device storing a program for controlling the processor; and the processor operative with the program to:

generate an image of a license plate of a customer in a drive through;

determine a set of license plate characters from the image, the set of license plate characters identifying a customer; and provide customized service to the customer.

* * * * *